Sept. 11, 1962     N. FRICK     3,053,559
CONNECTOR
Filed Nov. 16, 1959
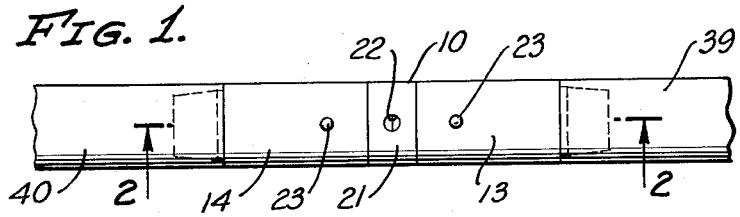
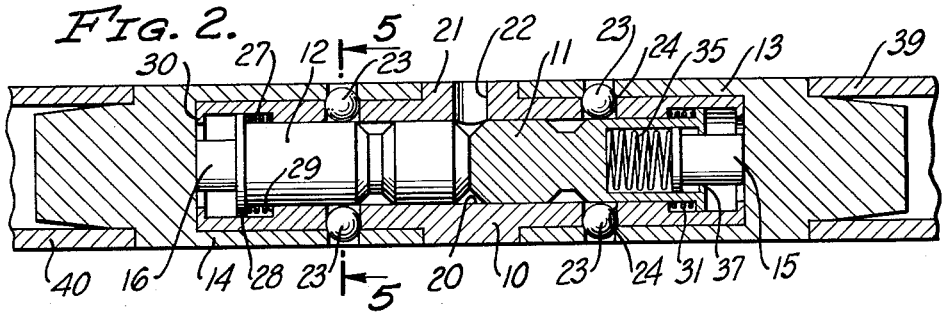
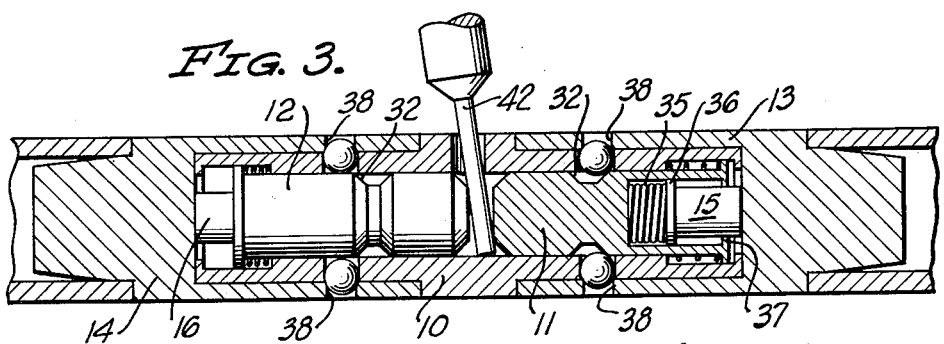
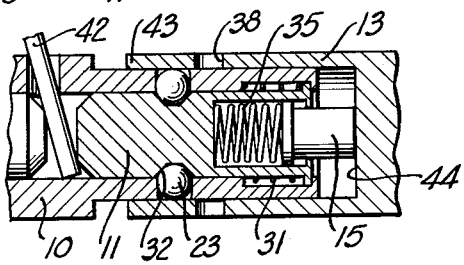
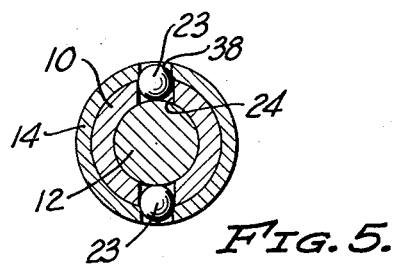
INVENTOR
NORVAL FRICK
BY HIS ATTORNEYS
HARRIS, KIECH, RUSSELL & KERN

United States Patent Office 3,053,559
Patented Sept. 11, 1962

3,053,559
CONNECTOR
Norval Frick, Los Angeles, Calif., assignor, by mesne assignments, to Aerpat A.G., Glarus, Switzerland, a corporation of Switzerland
Filed Nov. 16, 1959, Ser. No. 853,311
8 Claims. (Cl. 287—119)

This invention relates to quick engage and quick disengage connectors and, in particular, to a connector especially suited for joining rods in end-to-end alignment.

It is often desired to connect a plurality of short rods in end-to-end alignment to form a long rod. The long rod should have a uniform cross section and should be easily and quickly assembled and disassembled for replacement of a short rod and for storage, shipping and the like. Accordingly, it is an object of the invention to provide a connector of the detent type that may be used to repeatedly join rods in end-to-end alignment.

It is an object of the invention to provide a connector having a body with laterally moving detents adjacent each end and a plunger axially slidable in each end for actuating the corresponding detent, with the body receiving at each end, sleeves fixed to the rods, which sleeves are locked in position on the body by the detents. A further object is to provide such a connector with means for selectively moving each of the plungers from the locked to the unlocked condition for releasing the corresponding sleeve and rod carried thereby. Another object is to provide such a connector wherein the body has a lateral opening for manual insertion of an unlocking pin to engage the plunger for moving the plunger to the unlocked position.

It is an object of the invention to provide a connector having a pin axially slidable in the outer end of the plunger and a spring which urges the pin outward into engagement with the sleeve, so that release of the connector causes the sleeve to pop off the body and so that pushing of the sleeve over the body causes the detent to pop into the locked condition. A further object is to provide such a connector having a second spring for urging the plunger outward with respect to the body and into the unlocked condition so that the connector is always ready for receiving a sleeve.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 shows the connector of the invention used for joining two rods end-to-end;
FIG. 2 is an enlarged sectional view taken along the line 2—2 of FIG. 1;
FIGS. 3 and 4 are views similar to FIG. 2 showing the connector in the process of disengaging; and
FIG. 5 is a sectional view taken along the line 5—5 of FIG. 2.

The connector of the invention includes a body 10, plungers 11, 12, sleeves 13, 14, and pins 15, 16. The body 10 is ordinarily tubular in shape and has a longitudinal passage 20 opened at each end thereof for slidingly receiving the plungers 11, 12. The body is preferably provided with a central external annular shoulder 21 and a central lateral opening 22 that communicates with the passage 20.

A detent is carried in each half of the body for engaging the corresponding sleeves 13, 14 and locking the sleeves and body together. In the preferred form of detent shown herein, a plurality of balls 23 are positioned in corresponding lateral openings 24 in the body 10, the balls being movable inwardly and outwardly between an outer extended position as seen in FIG. 2 and an inner retracted position as seen in FIG. 4. The outer ends of the openings 24 are slightly closed, as by staking or peening, to retain the balls in the body when the body is separated from the sleeves.

The plungers 11, 12 are movable in the body between inward locked positions as seen in FIG. 2 and outward unlocked positions as seen in FIG. 4. A plunger spring 27 is positioned around the plunger 12 between a rim 28 on the plunger and a shoulder 29 of the body, the plunger spring urging the plunger outward into engagement with a rim 30 of the body. A plunger spring 31 is similarly positioned about the plunger 11.

Each plunger has an annular groove 32 for receiving the detent balls 23 when the plunger is in the unlocked position (FIG. 4).

A pin spring 35 is positioned in the outer end of the plunger 11 in engagement with a head 36 of the pin 15 for urging the pin outward. The pin 15 is retained in the plunger by engagement of the head 36 with an in-turned flange 37. A similar pin spring is positioned within the plunger 12 for urging the pin 16 outward.

The sleeve 13 is provided with lateral openings 38 which are in alignment with the lateral openings 24 of the body when the sleeve is positioned over the body, so that the detent balls 23 enter the openings 38 of the sleeve and fix the sleeve in position on the body, as seen in FIG. 2. Similar openings are provided in the sleeve 14. Also, as illustrated in FIGS. 2–4, each of the sleeves is formed having a closed bottom or end wall at the rod mounted end thereof. In the embodiment shown herein, a tubular rod 39 is mounted on the sleeve 13 and a similar tubular rod 40 is mounted on the sleeve 14. The rod may be fixed to the sleeve by any suitable means such as by a threaded connection or by welding. A plurality of rods such as the rods 39, 40, may each have a sleeve of the connector of the invention fixed to each end thereof. Then the plurality of rods can be joined end-to-end to form a single long rod of uniform cross section. The outside diameters of the sleeves and of the shoulder 21 of the body can be made the same as that of the rods to provide an unbroken surface for the assembled unit. Alternatively, the shoulder 21 can be omitted on the body and the sleeves 13, 14 can abut each other to provide the uniform surface. Of course, the connector is not restricted to the cylindrical shape shown and may have other cross sections such as square, hexagonal and the like.

When the connector is assembled, both plungers are in their inner locking positions with the ball detents moved to their extended positions in engagement with the openings in the sleeves. The outer ends of the pins 15, 16 are in engagement with the end walls of the corresponding sleeves 13, 14 to partially compress the pin springs and maintain the plungers in the locked positions. As seen in FIG. 2, the plunger springs 27, 31 are also partially compressed and urge the plungers towards the unlocked positions. However, the pin springs are made stronger than the plunger springs so that the connector remains in the locked condition.

The connector is unlocked by moving a plunger outward against the urging of the pin spring. This may be done by inserting a tool 42 through the lateral opening 22 into the passage 20, as seen in FIG. 3. The sleeve 13 may be released by moving the lower end of the tool 42 to the right, thereby compressing the pin spring 35 and moving the groove 32 of the plunger 11 into alignment with the detent balls. Compression of the spring 35 exerts a force to the right on the sleeve 13 through the pin 15, thereby urging the ball detents toward their inner retracted position. Hence, as soon as the plunger groove is in alignment with the ball detents as seen in FIG. 4, the balls are forced inward and the sleeve 13 is popped off of the body 10. The sleeve 14 may be removed in a similar manner by moving the lower end of the tool 42 to the left.

When the sleeve is removed, the pin is moved to its fully extended position and the detent balls are free to move in and out. A sleeve is mounted on the body by sliding the sleeve over the body to the position shown in FIG. 4. The elements of the connector are dimensioned so that the edge 43 of the sleeve passes over the detent balls before the wall 44 engages the pin with sufficient force to move the plunger against the spring 31. After the balls are moved to their inner position by the passage of the sleeve, further movement of the sleeve compresses the pin spring 35 and urges the plunger 11 to the left. Then when the openings 38 of the sleeve are in alignment with the detent openings 24, the compressed pin spring moves the plunger to the right and moves the balls outward into the locking position of FIG. 1. It should be noted that while the plunger springs 27, 31 are not essential to the operation of the connector, they do maintain the plungers in the extended positions when the connector is disassembled, thereby facilitating engagement of a sleeve with the body of the connector.

The connector of the invention provides for assembly of rods in end-to-end alignment. Either sleeve of the connector may be removed and replaced without disturbing the other sleeve. Alternatively, both sleeves may be removed and the body used for joining other sleeves. Also, a unitary rod may be manufactured having the necessary sleeve dimensions and lateral openings at each end so that sleeves need not be provided separate from the rods.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a device for connecting rods end-to-end in axial alignment, the combination of: a body having a longitudinal passage therein and a central transverse opening in communication with said passage; a first detent carried adjacent one end of said body and movable inwardly and outwardly between inner retracted and outer extended positions, said detent projecting laterally from said body when in said extended position; a second detent carried adjacent the other end of said body and movable inwardly and outwardly between inner retracted and outer extended positions, said detent projecting laterally from said body when in said extended position; a first plunger having inner and outer ends and being movable in said passage between locked and unlocked positions and having means thereon for moving said detent outwardly into its extended position when said plunger is in said locked position; a second plunger having inner and outer ends and being movable in said passage between locked and unlocked positions and having means thereon for moving said detent outwardly into its extended position when said plunger is in said locked position, with said inner ends of said plungers abutting adjacent said central opening when both are in said locked positions; a first sleeve with one end slidable over said body and having means thereon for engaging said first detent when in its extended position for fixing said sleeve on said body, with the other end of said sleeve adapted to be joined to a rod in axial alignment; a second sleeve with one end slidable over said body and having means thereon for engaging said second detent when in its extended position for fixing said sleeve on said body, with the other end of said sleeve adapted to be joined to a rod in axial alignment; a first pin slidably positioned in said outer end of said first plunger; a second pin slidably positioned in said outer end of said second plunger; a first pin spring engaging said first plunger and pin and urging said pin outward for engaging said first sleeve; and a second pin spring engaging said second plunger and pin and urging said pin outward for engaging said second sleeve, whereby sliding a sleeve over said body compresses the pin spring, moves the plunger to the locked position, and moves the detent to the extended position.

2. In a device for connecting rods end-to-end in axial alignment, the combination of: a body having a longitudinal passage therein; a first detent carried adjacent one end of said body and movable inwardly and outwardly between inner retracted and outer extended positions, said detent projecting laterally from said body when in said extended position; a second detent carried adjacent the other end of said body and movable inwardly and outwardly between inner retracted and outer extended positions, said detent projecting laterally from said body when in said extended position; a first plunger having inner and outer ends and being movable in said passage inwardly and outwardly between locked and unlocked positions respectively, and having means thereon for moving said detent outwardly into its extended position when said plunger is in said locked position; a second plunger having inner and outer ends and being movable in said passage inwardly and outwardly between locked and unlocked positions respectively, and having means thereon for moving said detent outwardly into its extended position when said plunger is in said locked position; a first sleeve with one end slidable over said body and having means thereon for engaging said first detent when in its extended position for fixing said sleeve on said body, with the other end of said sleeve adapted to be joined to a rod in axial alignment; a second sleeve with one end slidable over said body and having means thereon for engaging said second detent when in its extended position for fixing said sleeve on said body, with the other end of said sleeve adapted to be joined to a rod in axial alignment; a first pin slidably positioned in said outer end of said first plunger; a second pin slidably positioned in said outer end of said second plunger; a first pin spring engaging said first plunger and pin and urging said pin outward for engaging said first sleeve; a second pin spring engaging said second plunger and pin and urging said pin outward for engaging said second sleeve; and means for selectively moving each of said plungers from the locked position to the unlocked position to compress the corresponding pin spring and disengage the detent from the sleeve.

3. In a device for connecting rods end-to-end in axial alignment, the combination of: a body having a longitudinal passage therein and a central transverse opening in communication with said passage; a first detent carried adjacent one end of said body and movable inwardly and outwardly between inner retracted and outer extended positions, said detent projecting laterally from said body when in said extended position; a second detent carried adjacent the other end of said body and movable inwardly and outwardly between inner retracted and outer extended positions, said detent projecting laterally from said body when in said extended position; a first plunger having inner and outer ends and being movable in said passage between locked and unlocked positions and having means thereon for moving said detent outwardly into its extended position when said plunger is in said locked position; a second plunger having inner and outer ends and being movable in said passage between locked and unlocked positions and having means thereon for moving said detent outwardly into its extended position when said plunger is in said locked position, with said inner ends of said plungers abutting adjacent said central opening when both are in said locked positions; a first sleeve with one end slidable over said body and having means thereon for engaging said first detent when in its extended position for fixing said sleeve on said body, with the other end of said sleeve adapted to be joined to a rod in axial alignment; a second sleeve with one end slidable over said body and having means thereon for engaging said second detent when in its extended position for fixing said sleeve on said body, with the other end of said sleeve adapted to be joined to a rod in axial alignment; a first pin slidably positioned in said outer end of said first plunger; a second pin slidably positioned in said outer end of said second plunger; a first pin spring engaging said first plunger and pin and urging said pin outward for engaging said first sleeve; a second pin spring engaging said second plunger and pin and urging said pin outward for engaging said second sleeve; a first plunger spring engaging said first plunger and said body and urging said plunger outward to its unlocked position; and a second plunger spring engaging said second plunger and said body and urging said plunger outward to its unlocked position.

4. In a device for connecting rods having a uniform outside diameter end-to-end in axial alignment, the combination of: a body having a longitudinal passage therein and a central transverse opening in communication with said passage with the maximum diameter of said body not greater than said outside diameter of the rods being joined; a first detent carried adjacent one end of said body and movable inwardly and outwardly between inner retracted and outer extended positions, said detent projecting laterally from said body less than said outside diameter when in said extended position; a second detent carried adjacent the other end of said body and movable inwardly and outwardly between inner retracted and outer extended positions, said detent projecting laterally from said body less than said outside diameter when in said extended position; a first plunger having inner and outer ends and being movable in said passage between locked and unlocked positions and having means thereon for moving said detent outwardly into its extended position when said plunger is in said locked position; a second plunger having inner and outer ends and being movable in said passage between locked and unlocked positions and having means thereon for moving said detent outwardly into its extended position when said plunger is in said locked position, with said inner ends of said plungers abutting adjacent said central opening when both are in said locked positions; a first sleeve of a maximum diameter substantially equal to said outside diameter, with one end slidable over said body and having means thereon for engaging said first detent when in its extended position for fixing said sleeve on said body, with the other end of said sleeve adapted to be joined to a rod in axial alignment; a second sleeve of a maximum diameter substantially equal to said outside diameter, with one end slidable over said body and having means thereon for engaging said second detent when in its extended position for fixing said sleeve on said body, with the other end of said sleeve adapted to be joined to a rod in axial alignment; a first pin slidably positioned in said outer end of said first plunger; a second pin slidably positioned in said outer end of said second plunger; a first pin spring engaging said first plunger and pin and urging said pin outward for engaging said first sleeve; and a second pin spring engaging said second plunger and pin and urging said pin outward for engaging said second sleeve, whereby sliding a sleeve over said body compresses the pin spring, moves the plunger to the locked position, and moves the detent to the extended position.

5. In a device for connecting rods end-to-end in axial alignment, the combination of: a body having a longitudinal passage therein, a central external annular shoulder, and a central transverse opening through said shoulder in communication with said passage; a first detent carried adjacent one end of said body and movable inwardly and outwardly between inner retracted and outer extended positions, said detent projecting laterally from said body when in said extended position; a second detent carried adjacent the other end of said body and movable inwardly and outwardly between inner retracted and outer extended positions, said detent projecting laterally from said body when in said extended position; a first plunger having inner and outer ends and being movable in said passage between locked and unlocked positions and having means thereon for moving said detent outwardly into its extended position when said plunger is in said locked position; a second plunger having inner and outer ends and being movable in said passage between locked and unlocked positions and having means thereon for moving said detent outwardly into its extended position when said plunger is in said locked position, with said inner ends of said plungers abutting in alignment with said central opening when both are in said locked positions; a first sleeve with one end slidable over said body into engagement with said shoulder and having means thereon for engaging said first detent when in its extended position for fixing said sleeve on said body, with the other end of said sleeve adapted to be joined to a rod in axial alignment; a second sleeve with one end slidable over said body into engagement with said shoulder and having means thereon for engaging said second detent when in its extended position for fixing said sleeve on said body, with the other end of said sleeve adapted to be joined to a rod in axial alignment; a first pin slidably positioned in said outer end of said first plunger; a second pin slidably positioned in said outer end of said second plunger; a first pin spring engaging said first plunger and pin and urging said pin outward for engaging said first sleeve; and a second pin spring engaging said second plunger and pin and urging said pin outward for engaging said second sleeve, whereby sliding a sleeve over said body compresses the pin spring, moves the plunger to the locked position, and moves the detent to the extended position.

6. A releasable rod connector comprising: an elongated tubular body having an open end; a rod mounted sleeve receivable over said body, said sleeve having a closed end wall; at least one detent in said body releasably engageable with said sleeve; at least one plunger in said body, said plunger being formed having a camming groove therein to permit the release of said sleeve by said detent when said groove is in alignment with said detent, and being movable to a locking position wherein said detent is cammed into locking engagement with said sleeve; and means for urging said plunger to said locking position, said means being carried by said body and including a compression spring having one end in engagement with said plunger and a slidable abutment member in engagement with the other end of said spring, said abutment member being engageable by the end wall in said sleeve through the open end of said body for movement against said spring when said sleeve is received over said body.

7. The device recited in claim 6 in which said body is formed having a lateral opening through which access to said plunger is possible to move it to the detent releasing position.

8. The device recited in claim 6 including additional spring means also carried by said body for urging said plunger to a detent releasing position when said sleeve is removed from said body.

References Cited in the file of this patent
UNITED STATES PATENTS

| | | |
|---|---|---|
| 2,123,035 | Bozeman | July 5, 1938 |
| 2,443,043 | Laskey | June 8, 1948 |
| 2,837,370 | Stott et al. | June 3, 1958 |
| 2,848,074 | Puddy | Aug. 19, 1958 |
| 2,954,994 | Beers | Oct. 4, 1960 |